J. B. PITTS.
Grain Drill.
No. 52,445.
Patented Feb. 6, 1866.
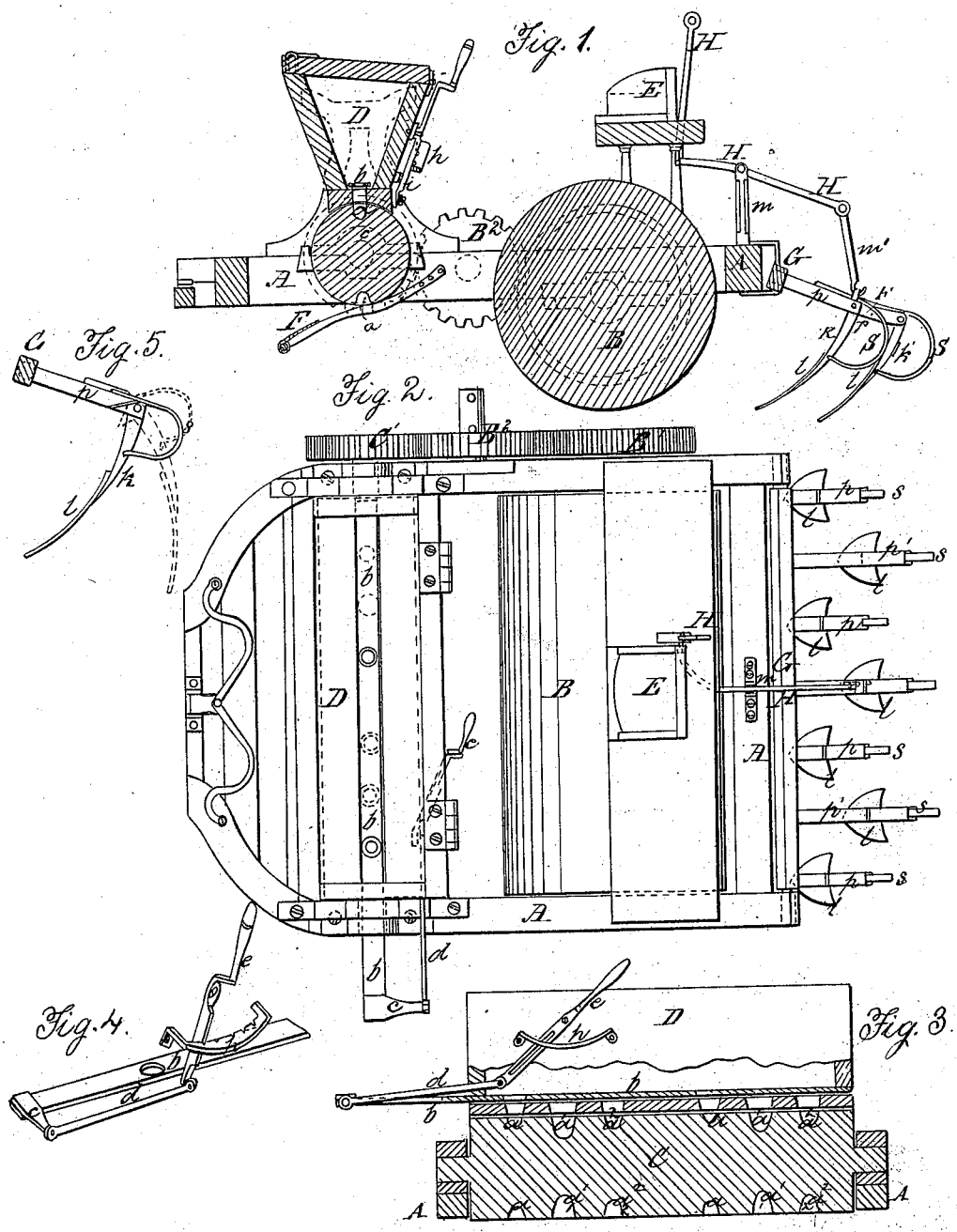

UNITED STATES PATENT OFFICE.

JOHN B. PITTS, OF SALEM, INDIANA.

IMPROVEMENT IN SEEDING-MACHINES.

Specification forming part of Letters Patent No. 52,445, dated February 6, 1866.

*To all whom it may concern:*

Be it known that I, JOHN B. PITTS, of Salem, in the county of Washington and State of Indiana, have invented a new and Improved Seeding-Machine; and I do hereby declare that the following is a full, clear, and exact description thereof, reference being had to the accompanying drawings, making a part of this specification, in which—

Figure 1 is a longitudinal section taken in a vertical plane through the improved machine. Fig. 2 is a top view of the machine. Fig. 3 is a sectional view, showing the manner of dropping different quantities of seed at different times. Fig. 4 is a perspective view, showing the manner of adjusting and setting the seed-slide for dropping different quantities of seed. Fig. 5 is a side view, showing one of the elastic teeth in two positions.

This invention is intended for dropping different quantities of seed at different times from a single hopper by a simple adjustment of the seed-slide with respect to holes of different sizes in a revolving cylindrical dropper, and also for enabling the attendant to adjust the said slide while the machine is in operation, and to determine the amount of seed which is distributed to the acre.

It is also intended by my invention to arrange a gang of teeth in rear of a large driving-roller in such manner that after the seeds are dropped said roller will press them into the ground and break up the clods of earth previously to covering the seed by the succeeding teeth, as will be hereinafter described.

To enable others skilled in the art to understand my invention, I will describe its construction and operation.

The frame A consists of two longitudinal beams, which are secured together by means of transverse braces. This frame A is supported upon a large roller, B, which carries on one end a spur-wheel, B′, that communicates a rotary motion to a cylinder, C, through the medium of a spur-wheel, B², and a spur-wheel, C′, as shown in Figs. 1 and 2.

The cylinder C has a number of seed-cups, $a\ a'\ a^2$, formed in its surface for receiving seed from the hoppers D and dropping them upon the ground as this cylinder is rotated. These seed-cups are arranged in pairs diametrically opposite each other, and the three pairs on one side of the middle of the length of the cylinder vary in size, but correspond in size to the three pairs on the opposite side of the middle of the length of said cylinder, as clearly shown in the sectional view, Fig. 3.

Directly above the cylinder C is a hopper, D, the bottom of which is concave, so as fit snugly upon the cylinder, as shown in Fig. 1. Upon this hopper-bottom is a seed-slide, $b$, which projects out from one end of the hopper some distance, and has a plate, $c$, secured at right angles to it, to the end of which a connecting-rod, $d$, is pivoted. The opposite end of this rod is pivoted to a lever, $e$, which is pivoted to the rear side of the hopper, as clearly shown in Figs. 1 and 3.

The hopper-bottom has six holes through it corresponding to the seed-cups in the cylinder C, and the seed-slide has two holes through it which can be brought to register with two pairs of holes of an equal size in the cylinder C, as shown in Figs. 2 and 3, by moving the lever $e$ a certain distance either to the right or left, according to the quantity of seed which it is desired to distribute; or by adjusting the seed-slides so that its holes will come between any two pairs of the seed-cups the seed will not escape from the hopper.

In Fig. 3 I have represented the seed-slide in a position for discharging seed from the hopper into the two smallest pairs of seed-cups, $a$. By moving the slide to the cups $a'$ the largest quantity of seed will be distributed, as these cups $a'$ are the largest, and by moving the slide on farther its holes will be brought over the seed-cups $a^2$. In this way three different quantities of seeds can be distributed at different times from the hopper D by a simple adjustment of the seed-slide by means of the lever $e$. These adjustments might be effected and the machine adapted to sow any given quantity of seed per acre very readily if there was no seed in the hopper; but when the hopper is filled with seeds so that the slide $b$ cannot be seen some difficulty would be found to arise in making the desired adjustments, to remedy which I have applied a graduated gage to the lever $e$ on the outside of the hopper, so that the attendant, while riding upon the machine and sitting upon the seat E, can at a glance ascertain the quantity of seed being dropped. This gage consists of a segment, $h$, which is secured to the back of the hopper D so as to leave a space between said segment and the hopper for the lever $e$ to play laterally.

The inner edge of the segment $h$ is notched, as shown in Fig. 4, for receiving a knife-edge which is formed on the lever $e$, so that this lever may be held at any desired point when pressed upon by a spring, $i$. Each one of the notches of the segment $h$ indicates a certain position of the seed-slide, and, if desirable, marks may be made opposite each notch indicating the quantity of seed which will be distributed per acre when the lever $e$ is adjusted in such notches.

Intermediate notches may be made for holding the lever in such a position that no seed will escape from the hopper.

Beneath the cylinder C, and a little in advance of it, a distributing-board, F, may be arranged for scattering seed falling from the seed-cups.

To the rear extremities of the longitudinal beams of the frame A a transverse bar, G, is applied, so that it will rock freely in suitable bearings. To this bar a number of long and short plow-beams, $p\ p'$, are rigidly secured, to the rear ends of which plow or shovel standards $k\ k'$ are pivoted, as shown in Fig. 5. These standards have shovel-plates $l$ secured to them, as shown in the drawings, and they are held to their work by means of springs $s\ s$, which will resist any ordinary strain upon the shovels; but should these shovels meet with any obstruction which would be liable to break the machine the springs $s$ will yield, as shown in Fig. 5 in red lines, and allow the shovel so obstructed to pass over it.

When desirable, all the shovels may be elevated free from the ground by depressing the forward end of the lever H, which lever has its fulcrum upon the post $m$ and is connected at its rear end to the central plow-beam by means of a link, $m'$.

Having thus described my invention, what I claim as new, and desire to secure by Letters Patent, is—

1. The arrangement and combination of the hopper D, rotating seed-dropping cylinder C, supporting and driving drum B, and the gang of plows, the latter being applied to the frame A in rear of the roller B, and the whole operating substantially as described.

2. Combining with the cylinder C, having seed-cups of different sizes, the perforated slide $b$, pitman $d$, lever $e$, and the gage-plate $h$, substantially as described.

JOHN B. PITTS.

Witnesses:
WM. C. MCCASKEY,
ISAAC N. CARESS.